United States Patent
Yu

(10) Patent No.: US 8,300,281 B2
(45) Date of Patent: Oct. 30, 2012

(54) CALIBRATING DEVICE, MAPPING METHOD AND COMPENSATION METHOD USING THE SAME

(75) Inventor: Wan-Jhang Yu, Hsinchu (TW)

(73) Assignee: Microtek International Inc., Hsinchu (TW)

( * ) Notice: Subject to any disclaimer, the term of this patent is extended or adjusted under 35 U.S.C. 154(b) by 526 days.

(21) Appl. No.: 12/561,665

(22) Filed: Sep. 17, 2009

(65) Prior Publication Data

US 2011/0007367 A1 Jan. 13, 2011

(30) Foreign Application Priority Data

Jul. 10, 2009 (TW) .............................. 98123421 A

(51) Int. Cl.
*H04N 1/04* (2006.01)
(52) U.S. Cl. .................. 358/474; 358/406; 358/497
(58) Field of Classification Search .................. 358/474, 358/486, 497, 504, 1.2, 406
See application file for complete search history.

(56) References Cited

U.S. PATENT DOCUMENTS

| | | | | |
|---|---|---|---|---|
| 4,147,295 A * | 4/1979 | Nojiri et al. | ............. | 235/462.19 |
| 5,591,957 A * | 1/1997 | Morikawa et al. | ............. | 235/494 |
| 6,325,487 B1 * | 12/2001 | Mantell | ............. | 347/41 |
| 6,594,401 B1 * | 7/2003 | Metcalfe et al. | ............. | 382/275 |
| 6,665,097 B1 * | 12/2003 | Inagaki | ............. | 358/471 |
| 7,515,772 B2 * | 4/2009 | Li et al. | ............. | 382/289 |
| 7,627,192 B2 * | 12/2009 | Yokochi | ............. | 382/261 |
| 8,054,517 B2 * | 11/2011 | Minamino | ............. | 358/505 |
| 8,113,615 B2 * | 2/2012 | Nishihara | ............. | 347/15 |
| 8,116,568 B2 * | 2/2012 | Daidoh | ............. | 382/182 |
| 2002/0140990 A1 * | 10/2002 | Liu | ............. | 358/406 |
| 2011/0164258 A1 * | 7/2011 | Nakamura | ............. | 358/1.2 |

* cited by examiner

*Primary Examiner* — Negussie Worku
(74) *Attorney, Agent, or Firm* — Muncy, Geissler, Olds & Lowe, PLLC

(57) ABSTRACT

A calibrating device including a pixel unit array and a pattern is provided. The pixel unit array comprises parallel warp lines and parallel weft lines. Each warp line crosses each weft line to define pixel units all over the pixel unit array. The pattern comprises some pixel units having a gray level different from a gray level of remainder pixel units in the pixel unit array. The pattern comprises spaced bars parallel to one another and not parallel to the warp lines and the weft lines. A characteristic of the pattern is utilized to define target pixel units and comparison pixel units, and the comparison procedure is implemented with the characteristic of the pattern. Positions and gap sizes of gaps between image sensors are mapped out by comparing the target pixel units with the comparison pixel units. The quality of a scanned image is improved with compensation for the gaps.

4 Claims, 6 Drawing Sheets

CALIBRATING DEVICE, MAPPING METHOD AND COMPENSATION METHOD USING THE SAME

FIELD OF THE INVENTION

The present invention generally relates to a calibrating device for an image sensor, a mapping method and a compensation method using the same, and more particularly to a calibrating device for a contact image sensor, a mapping method and a compensation method using the same.

DESCRIPTION OF THE RELATED ART

Image sensors used in scanners today mainly include charge-coupled device (CCD), contact image sensor (CIS), photomultiplier tube (PMT) and complementary metal oxide semiconductor (CMOS), wherein the CCD and the CIS are widely used in scanners.

In general, the CCD converts light into analog voltage signals and marks up grayscales of each pixel, and then an analog/digital converter converts the analog voltage signals into digital signals. Light provided by a light source must be reflected by mirrors and focused by optical lenses in an imaging process, thus the optical devices increase the total manufacturing cost of the scanner, and the light needs to be transmitted by a complicated optical path of a set of an optical system, including a light source and a plurality of mirrors and optical lenses, to form an image on a surface of the CCD. In addition, the light needs to be transmitted by a set of the mirrors and the optical lenses to form the image on a surface of the CCD, so as to result in color deviation and optical aberration and the color usually need to be corrected by scan software. However, since the scanner with the CCD uses optical lenses to form the image on the surface of the CCD, the depth of field is deeper and the quality of the generated image is better, even a raising spine of a book or other articles may be scanned to generate a clear scan result.

On the other hand, after light provided by a light source disposed within the scanner irradiates on the original image and is reflected thereby, the CIS senses the reflected light and converts light signals into electrical signals, an analog/digital conversion circuit located on a bottom plate of the scanner converts electrical signals into digital signals, and then the digital signals are transmitted to a computer to complete a whole scan process. Since the reflected light reflected by the original image can form an image on the CIS directly without the mirror and the optical lens, the total manufacturing cost of the scanner with the CIS is lower. The structure, the principle and the optical path of the scanner with the CIS are all simple, since the light source, the sensor and the amplifier thereof are integrated. Furthermore, since the reflected light reflected by a surface of the original image forms the image on the CIS directly, in theory, no color deviation and optical aberration is occurred, and the scan result is closest to the original image.

However, the scanner with the CIS has no mirror and optical lens, the CIS have to scan the original image closely, thus scan accuracy is lower, and quality of the scan result is lower than that scanned by the scanner with the CCD. Even so, the scanner with the CIS assured a place in the scanner market since it is lighter, thinner and easier to be carried, thus it is important to improve the scan result that scanned thereby.

SUMMARY OF THE INVENTION

There are lots of factors may result in poor scan result. Take the scanner with the CIS for instance, some inaccuracy, such as tolerances in a packaging process of the CIS, may result in non-uniform gaps between the CISs, and then discontinuous dispositions of the CISs result in a discontinuous scan result. Therefore, the present invention provides a calibrating device for gaps between image sensors and a mapping method using the same to improve the scan result by using a pattern of the calibrating device and a calculation to determine positions and sizes of the gaps between the image sensors, so as to compensate the scan result according to the positions and the sizes of the gaps.

In addition, all gaps, comprising shift gaps along an arrangement line of image sensors and alignment gaps offsetting the image sensors from the arrangement line, result in the discontinuous scan result. Thus, the present invention provides a calibrating device for the gaps between the image sensors and a compensation method using the same to compensate the shift gaps and the alignment gaps by using a pattern of the calibrating device to identify positions of the gaps and using pixel sizes and pixel numbers to determine gap sizes, so as to compensate the scan result according to the positions and the sizes of the gaps.

Accordingly, one embodiment provides a calibrating device comprising a pixel unit array and a pattern. The pixel unit array comprises a plurality of warp lines parallel to one another and a plurality of weft lines parallel to one another, wherein each warp line crosses each weft line to define a plurality of pixel units all over the pixel unit array. The pattern comprises some pixel units having a gray level different from a gray level of remainder pixel units in the pixel unit array, wherein the pattern comprises a plurality of spaced bars parallel to one another and not parallel to the warp lines and the weft lines In addition, another embodiment provides a method for mapping a gap between image sensors comprising the following steps. A scanned image of the foregoing calibrating device is obtained first. Then a comparison procedure is set, which comprises utilizing a characteristic of the pattern to define a target pixel unit and a comparison pixel unit first, and then counting a number of the target pixel units whose gray levels are different than the gray levels of the comparison pixel unit to obtain a value. Thereafter, the comparison procedure is implemented to the scanned image. After that, a gap size is determined according to the value, and then a coordinate and the gap size relative to the calibrating device where the gray levels of the target pixel unit are different from the comparison pixel unit are stored. Then the result of the method for mapping the gap between the image sensors may further be applied to a method for compensating a scanned image, so as to insert a pixel value into a scanned image of an object according to the coordinate and the gap size after the scanned image of the object is obtained.

DETAILED DESCRIPTION OF THE INVENTION

Reference will now be made in detail to specific embodiments of the present invention. Examples of these embodiments are illustrated in the accompanying drawings. While the invention will be described in conjunction with these specific embodiments, it will be understood that it is not intended to limit the invention to these embodiments. In fact, it is intended to cover alternatives, modifications, and equivalents as may be included within the spirit and scope of the invention as defined by the appended claims. In the following description, numerous specific details are set forth in order to provide a through understanding of the present invention. The present invention may be practiced without some or all of these specific details. In other instances, well-known process operations are not described in detail in order not to obscure the present invention.

Figure 1A:
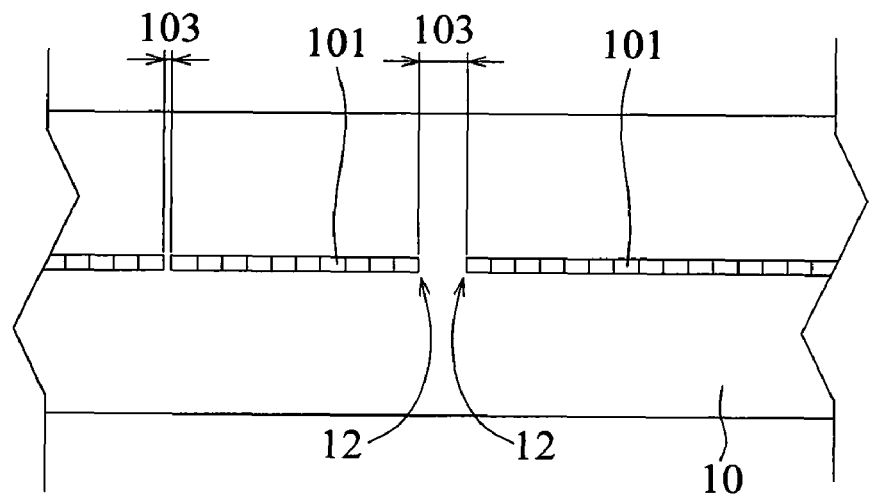
FIG. 1A illustrates an image sensor arrangement for illustrating a calibrating device and a method for compensating a scanned image according to an embodiment of the present invention.

FIG. 1A illustrates an image sensor arrangement for illustrating a calibrating device and a method for compensating a scanned image according to an embodiment of the present invention. Referring to FIG. 1A, a plurality of image sensors 101 are disposed on a substrate 10. In actual application, the image sensors 101 may be formed continuously without gaps, so as to form a plurality of segments 12 arranged end to end on the substrate 10 to define a first direction X, and a shift gap 103 may exist between each two adjacent segments 12 from end to end respectively. Note that in an actual situation, the image sensors 101 may also be formed on the substrate 10 without forming the segments 12, but each two adjacent image sensors 101 may have a shift gap 103 there-between, so as to define a first direction X, too. In addition, each two shift gaps 103 formed between two adjacent segments 12 or two adjacent image sensors 101 may be the same or different to one another according to the actual assembling situation.

Figure 1B:
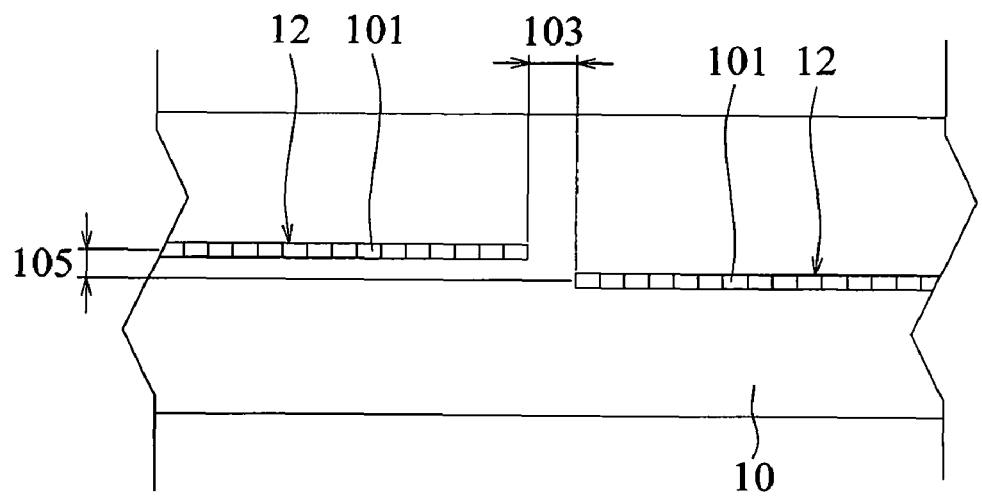
FIG. 1B illustrates an image sensor arrangement according to another embodiment of the present invention.

FIG. 1B illustrates an image sensor arrangement according to another embodiment of the present invention. Referring to FIG. 1B, a plurality of segments 12 or image sensors 101 are also arranged along the first direction X but offsetting a distance, so as to form gaps between each two adjacent segments 12 or each two image sensors 101 respectively. Herein, the distance between each two adjacent segments 12 or each two image sensors 101 relative to a second direction Y is an alignment gap 105 and that relative to the first direction X is a shift gap 103. Therefore, the calibrating device and the method for compensating a scanned image of the present invention may also apply to the image sensor arrangement as illustrated in FIG. 1B. Accordingly, all discontinuousness of the scanned image resulted from the shift gaps 103 relative to the first direction X and the alignment gaps 105 relative to the second direction Y may be compensated by the calibrating device and the method for compensating the scanned image of the present invention to enhance a quality of the scanned image, no matter how the segments 12 an the image sensors 101 are arranged.

Figure 2A:
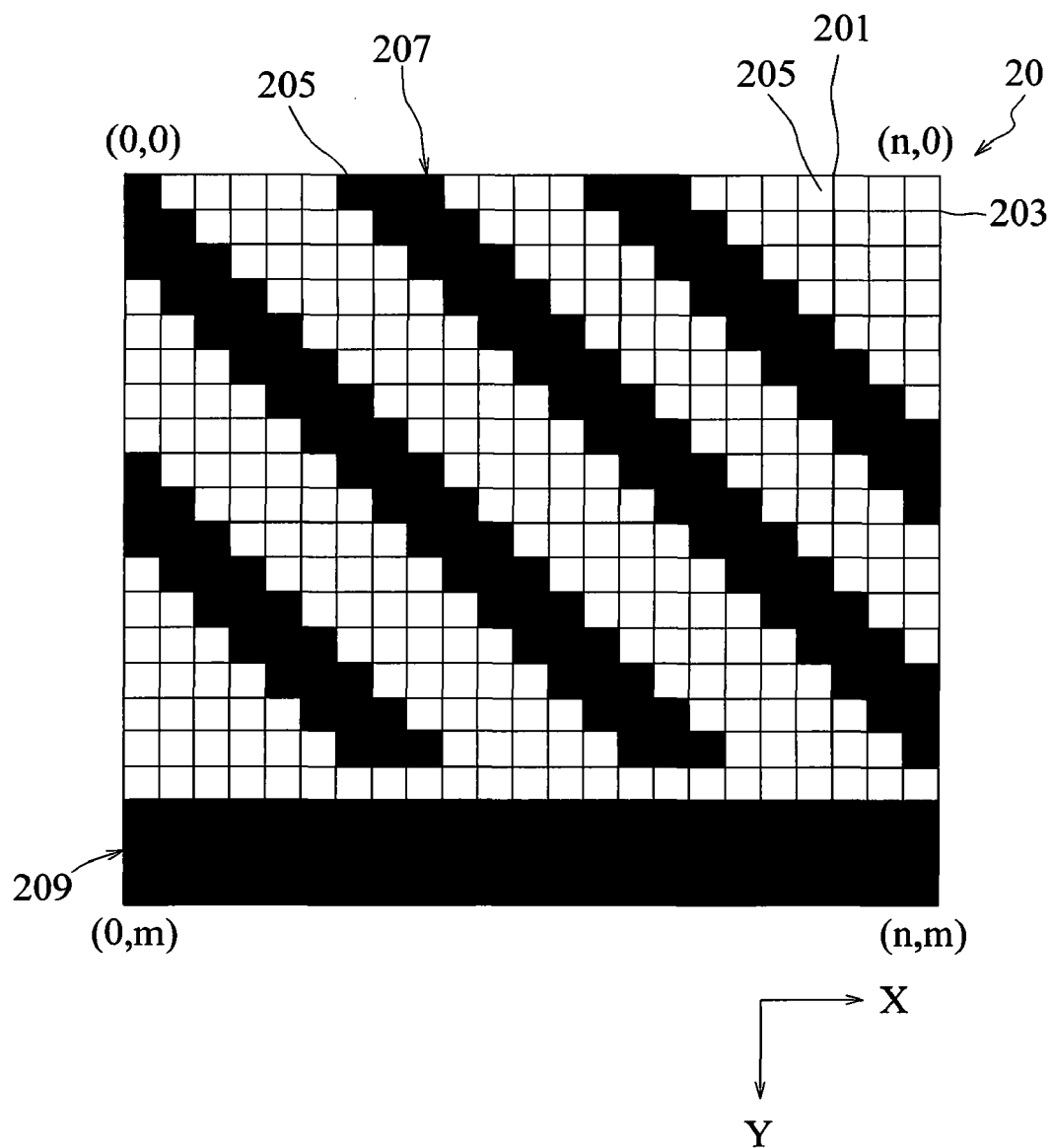
FIG. 2A illustrates a calibrating device according to an embodiment of the present invention.

FIG. 2A illustrates a calibrating device according to an embodiment of the present invention. Referring to FIG. 2A, a calibrating device 20 has a two-dimensional size, for example a rectangular shape with A4 (210 mm×294 mm) size. In addition, there are a plurality of warp lines 201 parallel to one another and a plurality of weft lines 203 parallel to one another, which are arranged all over the calibrating device 20. Each warp line 201 crosses each weft line 203 to define a plurality of intersection points, and four intersection points define a pixel unit 205 with the warp lines 201 and the weft lines 203, wherein the pixel units 205 are arranged all over the calibrating device 20 to form a pixel unit array, and sizes and shapes thereof are equal to one another. Note that the warp lines 201 or the weft lines 203 may be straight lines or curves, the calibrating device 20 illustrated in FIG. 2A is a partially enlarged view of an actual calibrating device, and the warp lines and the weft lines would not be formed thereon. In the present embodiment, n straight lines (n is a positive integer) parallel to the arrangement direction X of the image sensors (not shown in FIG. 2A) are defined as the warp lines 201, and m straight lines (m is a positive integer) are defined as the weft lines 203 and cross the warp lines 201 to form the pixel units 205 with rectangular shapes. The intersection points are marked from (0,0) at an upper left corner of the calibrating device 20 to (n,0) at an upper right corner of the calibrating device 20, to (0,m) at a lower left corner of the calibrating device 20, and to (n,m) at a lower right corner of the calibrating device 20, but the sequence of the marks are not limited herein. Furthermore, the calibrating device 20 may be divided into a background and a pattern with clearly different gray levels there-between, so as to be applied to a calculation thereafter. In an embodiment, colors of the background and the pattern are but not limited to whole white and whole black, for example the colors may be instead of colors with different gray levels besides black and white.

Note that a base unit of the pattern is a pixel unit 205 filled with black color. In addition, in the present embodiment, some continuous pixel units 205 filled with black color are formed as a spaced bar 207 not parallel to the warp lines 201 and the weft lines 203. In grant view, an include angle formed between each spaced bar 207 and each warp line 201 or each weft line 203 is not equal to 0° and 90°. However, the spaced bars 207 may be straight lines as illustrated in FIG. 2A or curves not shown herein, thus we can know that the present invention is not limited to the previous embodiment. In addition, besides the spaced bars 207, the calibrating device 20 further comprises a transverse bar 209 parallel to the weft line 203 and separate from all spaced bars 207. Moreover, a length of the transverse bar 209 is substantially equal to a whole length of the adjacent segments 12 or the image sensors 101, in other words, the length of the transverse bar 209 is substantially equal to an edge of the pixel unit array. Furthermore, in microscopic view, the spaced bars 207 may have jagged edges as illustrated in FIG. 2A are with, but are smooth straight lines with slopes in users' view. Accordingly, the pattern of the calibrating device 20 may be used for mapping the shift gaps and the alignment gaps.

Figure 2B:
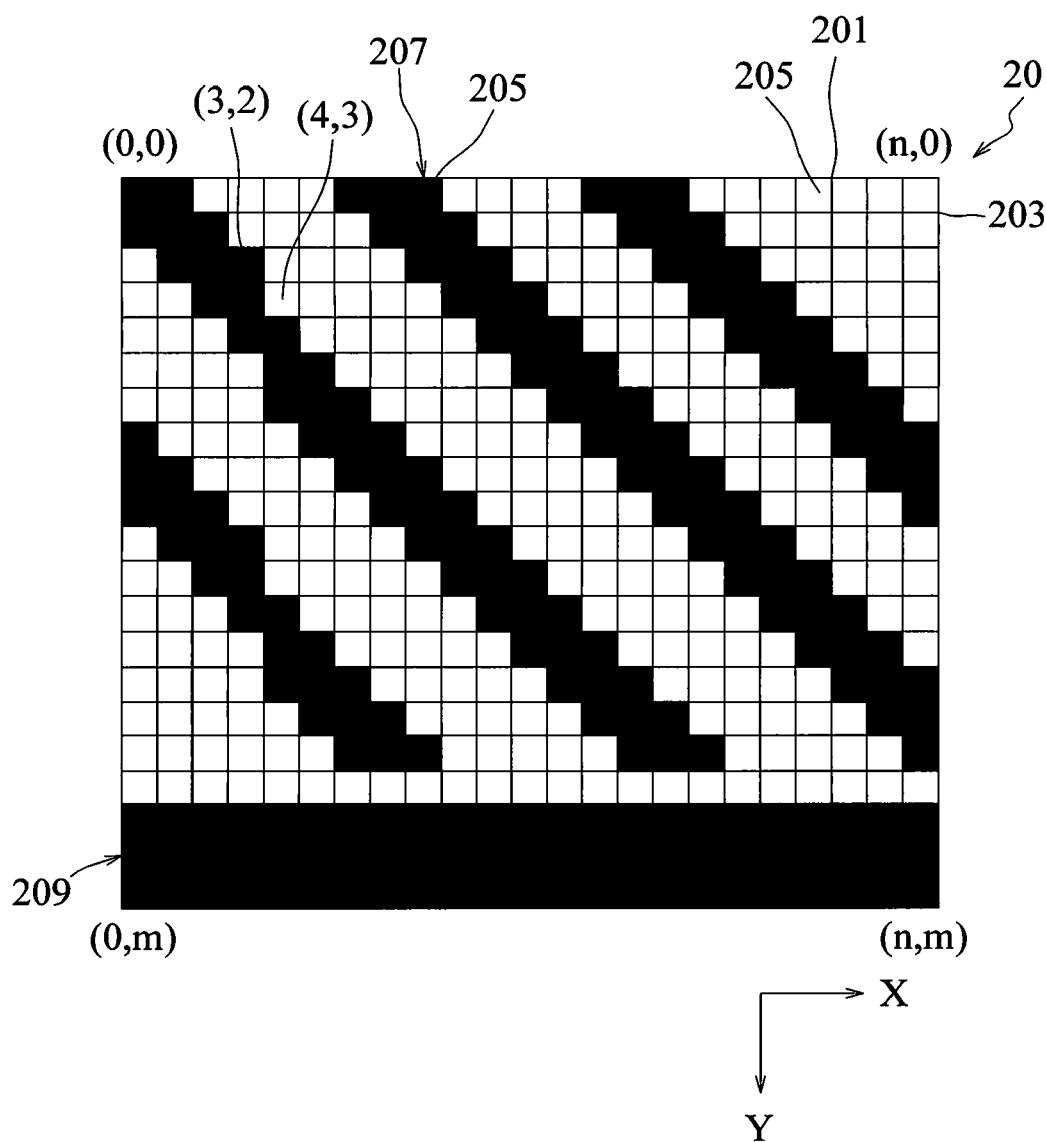
FIG. 2B illustrates a scanned image of a calibrating device according to an embodiment of the present invention.

FIG. 2B illustrates a scanned image of a calibrating device according to an embodiment of the present invention. After the calibrating device as illustrated in FIG. 2A is scanned by the image sensors as illustrated in FIG. 1A or FIG. 1B, the scanned image of the calibrating device is different from the original calibrating device relative to where the shift gaps are located on. Referring to FIG. 2B, the pixel units 205 are checked one by one from top to bottom and from left to right. In the following embodiment, the pixel units 205 are represented as those coordinates. The comparison procedure to compare a target pixel unit (0,a) with a lower right comparison pixel unit (1,a+1) is start from the pixel unit (0,0) to (0,m), wherein a is a positive integer. In the present embodiment, the colors of the pixel units (0,0) and (1,1) are both black, the colors of the pixel units (0,1) and (1,2) are both black, and the comparison procedure is repeated until the last target pixel unit (0,m). If each target pixel unit (0,a) and its comparison pixel unit (1,a+1) are both black or both white, there is no shift gap between the image sensors or the segments relative to the $0^{th}$ line and the $1^{st}$ line of the scanned image. Then the comparison procedure is repeated to compare the pixel units between the $1^{st}$ line and the $2^{nd}$ line of the scanned image, and that there is no shift gap between the image sensors or the segments relative to the $1^{st}$ line and the $2^{nd}$ line of the scanned image. The comparison procedure is repeated to compare the target pixel unit (3,2) and its comparison pixel unit (4,3) until it is found that the color of the pixel unit (3,2) is black and that of the pixel unit (4,3) is white. Therefore, there is a shift gap between the image sensors or the segments relative to the $3^{rd}$ line and the $4^{th}$ line of the scanned image, and a size of the shift gap is defined as one pixel unit. Thereafter, the comparison procedure is repeated to compare the lower target pixel unit (3,3) and its comparison pixel unit (4,4) until it is found that the colors of the target pixel unit and its comparison pixel unit are both black or both white, and if one of the colors of the pixel units is white and the other one is black, the size of the shift gap is added up with one more pixel unit. In the present embodiment, the colors of the target pixel unit (3,3) and its comparison pixel unit (4,4) are both black, thus the size of the shift gap is equal to one pixel unit. After all target pixel units are compared with those comparison pixel units, all comparison results are recorded on a memory or any kind of storage devices. In short, the comparison procedure is used to compare whether or not the gray levels of the target pixel unit and its comparison pixel unit of the scanned image is the same according to a characteristic of the pattern of the calibrating device as illustrated in FIG. 2A. Take a pattern with 45° (the included angle between the warp lines and the weft lines) straight lines for instance, the characteristic thereof is the slope of the straight lines equal to an absolute value 0.5, so the comparison pixel unit is a pixel unit adjacent to the target pixel unit and located on an extending line of a diagonal line of the target pixel unit. Therefore, the comparison procedure compares whether or not the gray levels of the target pixel unit and the adjacent comparison pixel unit located on the extending line of the diagonal line of the target pixel unit is the same, so as to count the size of the shift gap between the image sensors or the segments according to the different gray level situation. The comparison results can be recorded on a memory or any kind of storage devices. Therefore, in the following scanning process, the scanned image of an object relative to where the shift gaps located on can be compensated according to the comparison results, so as to enhance the quality of the scanned image.

On the other hand, the pattern of the calibrating device may have a characteristic with two or more variables, for example a pattern with curves. Thus, users may establish a table according to coordinates of the target pixel units relative to its comparison pixel units first, and then map out whether or not the shift gaps exist according to the data recorded in the table after the calibrating device is scanned. Understandable, users may also map out the shift gaps by tables even the pattern of the calibrating device have a characteristic with only one variable. In a word, the process of mapping out the shift gaps is but not limited to be implanted immediately or indirectly by using the table.

In addition, the transverse bar 209 may be used for mapping out whether or not the image sensors or the segments are aligned to one another according to whether or not the gray levels of the target pixel unit and the adjacent comparison pixel unit is the same. Similar to the process of mapping out the shift gaps, there is an alignment gap between the image sensors or the segments when the gray levels of the target pixel unit and the adjacent comparison pixel unit are different.

Figure 2C:
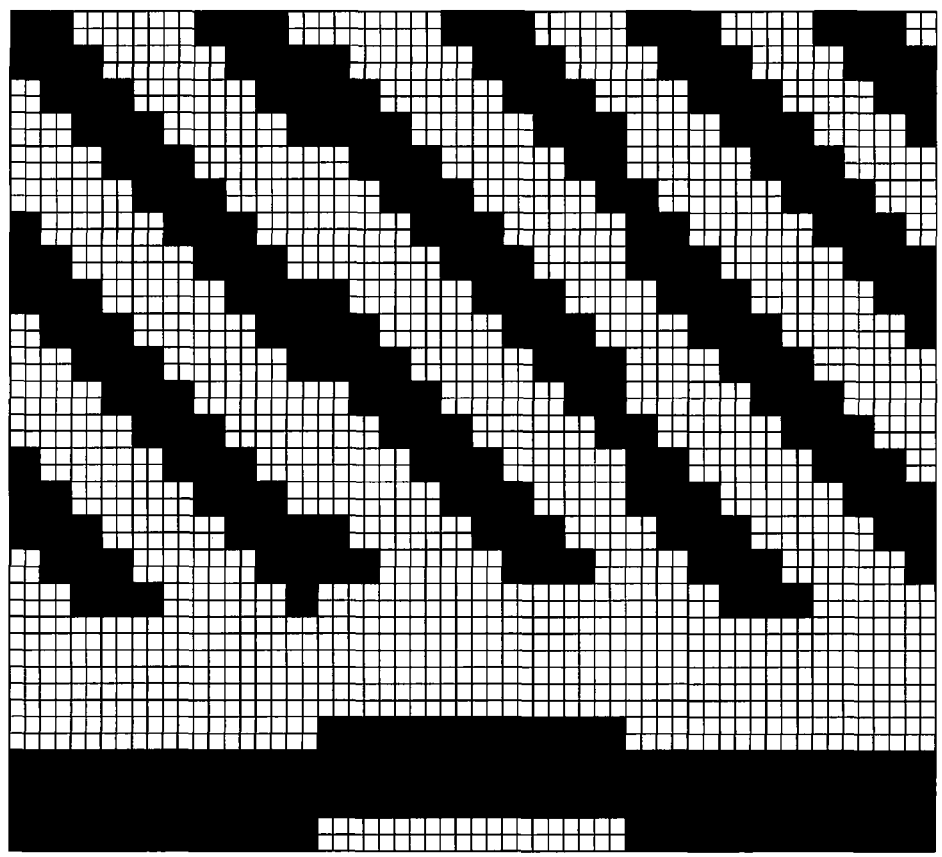
FIG. 2C illustrates a scanned image of a calibrating device according to another embodiment of the present invention.

FIG. 2C illustrates a scanned image of a calibrating device according to another embodiment of the present invention. FIG. 2C is similar to FIG. 2B besides a resolution of the scanned image of the calibrating device in FIG. 2C is larger than that of FIG. 2B. Thus, the size of the pixel unit as illustrated in FIG. 2C is smaller than that as illustrated in FIG. 2B. Note that the scanned image of the object should be compensated relative to the resolution of the scanned image of the calibrating device. Thus, the method can map out the shift gaps and the alignment gaps regardless whether the calibrating device is scanned with any kind of scan resolution. Referring to FIG. 2C, some gray levels of the target pixel units of the transverse bar 209 are different from that of those adjacent comparison pixel units. Thus, there are alignment gaps between the image sensors or the segments.

Figure 3A:
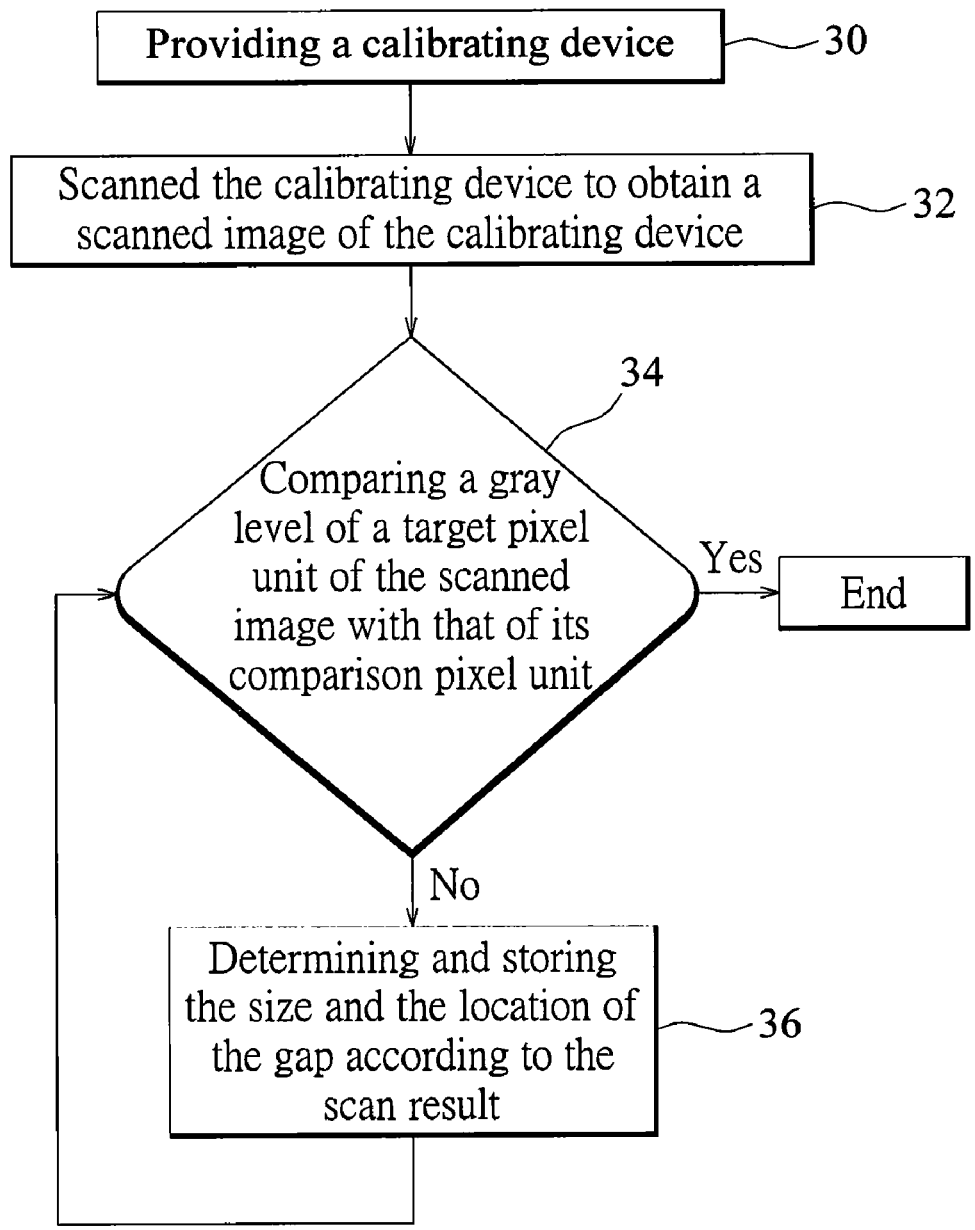
FIG. 3A illustrates a flowchart of a method for mapping gaps of an image sensor according to an embodiment of the present invention.

FIG. 3A illustrates a flowchart of a method for mapping gaps of an image sensor according to an embodiment of the present invention. Referring to FIG. 3A, a calibrating device is provided (step 30), wherein the calibrating device in the present embodiment has a background and a pattern with different gray levels. The calibrating device is scanned to obtain a scanned image of the calibrating device (step 32), and there are some discrepancies between the scanned image and the original pattern of the calibrating device when there is a shift gap or an alignment gap between the image sensors of a scanner. A gray level of a target pixel unit of the scanned image is compared with that of its comparison pixel unit (step 34) according to a comparison procedure, which defines the target pixel unit and the comparison pixel unit according to a characteristic of the pattern of the calibrating device. When the gray level of any target pixel unit is the same as that of its comparison pixel unit, the relative location has no shift gap and alignment gap between the image sensors of the scanner; otherwise, the relative location have shift gaps and alignment gaps between the image sensors of the scanner. Thereafter, the size and the location of the gap are determined according to the scan result (step 36), which comprises counting the gap size according to the number of the target pixel units whose the gray levels are different from the gray levels of the comparison pixel unit, and then storing a coordinate and the gap size relative to the calibrating device in the scanner or an storage device of other apparatus, for example a memory or a hard desk of a scanner.

Figure 3B:
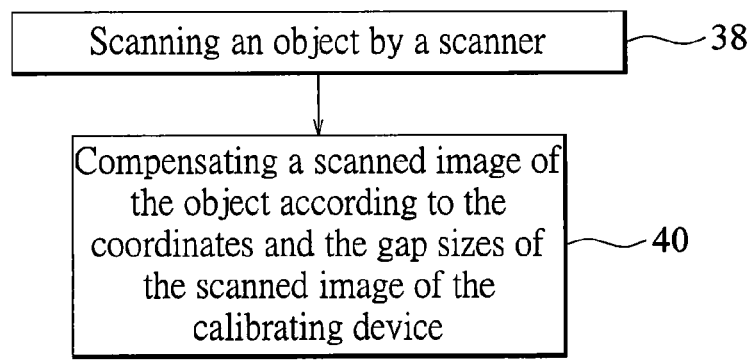
FIG. 3B illustrates a flowchart of a method for compensating a scanned image by utilizing the result of FIG. 3A according to an embodiment of the present invention.

FIG. 3B illustrates a flowchart of a method for compensating a scanned image by utilizing the result of FIG. 3A according to an embodiment of the present invention. Referring to FIG. 3B, an object is scanned by a scanner (step 38). A scanned image of the object is compensated according to the coordinates and the gap sizes of the scanned image of the calibrating device (step 40). In an embodiment, the gap size is equal to one pixel unit, thus the scanned image of the object is compensated by inserting a pixel value into each pixel unit of each line relative to each gap, wherein the pixel value is, but not limited to, an average value of two pixel values at two sides of the gap. Accordingly, the compensated scanned image is more completed and smoother, thus the quality of the compensated scanned image is better.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for mapping a gap between image sensors, comprising:
    providing a calibrating device comprising:
    a pixel unit array comprising:
    a plurality of warp lines parallel to one another; and
    a plurality of weft lines parallel to one another, wherein each of said warp lines crosses each of said weft lines to define a plurality of pixel units all over said pixel unit array; and
    a pattern comprising some of said pixel units having a gray level different from a gray level of remainder said pixel units in said pixel unit array, wherein said pattern comprises a plurality of spaced bars parallel to one another and not parallel to said warp lines and said weft lines;
    obtaining a scanned image of said calibrating device;
    setting a comparison procedure comprising:
    utilizing a characteristic of said pattern to define a target pixel unit and a comparison pixel unit;
    counting a number of said target pixel units whose said gray levels are different than said gray levels of said comparison pixel unit to obtain a value;
    implementing said comparison procedure to said scanned image; and
    determining a gap size according to said value and storing a coordinate and said gap size relative to said calibrating device where said gray levels of said target pixel unit and said comparison pixel unit are different.

2. The method as claimed in claim 1, wherein said step of providing said calibrating device further comprises setting a color of said pixel units for consisting said pattern is black, and a color of remainder said pixel units is white.

3. The method as claimed in claim 1, wherein said characteristic of said pattern means said spaced bars are straight lines, and said step of setting said comparison procedure further comprises determining slops of said spaced bars, so as to let said comparison pixel units located on extending lines of diagonal lines of said target pixel units respectively.

4. A method for compensating a scanned image, comprising:
    providing a calibrating device comprising:
    a pixel unit array comprising:
    a plurality of warp lines parallel to one another; and
    a plurality of weft lines parallel to one another, wherein each of said warp lines crosses each of said weft lines to define a plurality of pixel units all over said pixel unit array; and
    a pattern comprising some of said pixel units having a gray level different from a gray level of remainder said pixel units in said pixel unit array, wherein said pattern comprises a plurality of spaced bars parallel to one another and not parallel to said warp lines and said weft lines;
    obtaining a scanned image of said calibrating device and a scanned image of an object;
    setting a comparison procedure comprising:
    utilizing a characteristic of said pattern to define a target pixel unit and a comparison pixel unit;
    counting a number of said target pixel units whose said gray levels are different than said gray levels of said comparison pixel unit to obtain a value;
    implementing said comparison procedure to said scanned image of said calibrating device;
    determining a gap size according to said value and storing a coordinate and said gap size relative to said calibrating device where said gray levels of said target pixel unit and said comparison pixel unit are different; and
    inserting a pixel value into said scanned image of said object according to said coordinate and said gap size.

* * * * *